(12) United States Patent
Huang et al.

(10) Patent No.: US 9,053,737 B2
(45) Date of Patent: Jun. 9, 2015

(54) HEAT ASSISTED MAGNETIC RECORDING DEVICES

(71) Applicant: SEAGATE TECHNOLOGY LLC, Cupertino, CA (US)

(72) Inventors: Xiaoyue Huang, Eden Prairie, MN (US); Michael C. Kautzky, Eagan, MN (US); Zoran Jandric, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/719,749

(22) Filed: Dec. 19, 2012

(65) Prior Publication Data

US 2013/0107679 A1 May 2, 2013

Related U.S. Application Data

(63) Continuation-in-part of application No. 12/976,559, filed on Dec. 22, 2010.

(60) Provisional application No. 61/638,254, filed on Apr. 25, 2012.

(51) Int. Cl.
*G11B 11/00* (2006.01)
*G11B 13/08* (2006.01)
*G11B 5/31* (2006.01)
*G11B 5/60* (2006.01)
*G11B 5/00* (2006.01)

(52) U.S. Cl.
CPC ............. *G11B 13/08* (2013.01); *G11B 5/314* (2013.01); *G11B 2005/0021* (2013.01); *G11B 5/6088* (2013.01)

(58) Field of Classification Search
None
See application file for complete search history.

(56) References Cited

U.S. PATENT DOCUMENTS

| 3,922,622 | A | * | 11/1975 | Boyd et al. .................... 333/145 |
|---|---|---|---|---|
| 5,600,619 | A | | 2/1997 | Takehoshi |
| 5,680,385 | A | | 10/1997 | Nagano |
| 7,391,590 | B2 | | 6/2008 | Matono |
| 7,609,480 | B2 | | 10/2009 | Shukh |
| 8,320,220 | B1 | * | 11/2012 | Yuan et al. ................. 369/13.33 |
| 8,351,307 | B1 | * | 1/2013 | Wolf et al. ................. 369/13.33 |
| 8,486,286 | B1 | * | 7/2013 | Gao et al. ......................... 216/22 |
| 2002/0067571 | A1 | * | 6/2002 | Yoshida et al. ............... 360/126 |
| 2005/0024957 | A1 | | 2/2005 | Gider |
| 2006/0233061 | A1 | | 10/2006 | Rausch |
| 2006/0233062 | A1 | | 10/2006 | Bedillion |
| 2007/0036040 | A1 | | 2/2007 | Mihalcea |
| 2007/0126021 | A1 | * | 6/2007 | Ryu et al. ....................... 257/103 |
| 2010/0214685 | A1 | * | 8/2010 | Seigler et al. .................... 360/59 |
| 2011/0109821 | A1 | * | 5/2011 | Tang et al. ....................... 349/32 |
| 2011/0228418 | A1 | | 9/2011 | Sasaki |

(Continued)

*Primary Examiner* — Adam R Giesy
*Assistant Examiner* — Henok Heyi
(74) *Attorney, Agent, or Firm* — Mueting, Raasch & Gebhardt, P.A.

(57) ABSTRACT

Devices having an air bearing surface, the device including a magnetic write pole positioned adjacent the air bearing surface; a near field transducer including a peg region and an adjacent disk region, wherein the peg region is adjacent the air bearing surface; a heat sink; and an optical waveguide including a top cladding layer and a core layer, wherein the heat sink is positioned between the magnetic write pole and the near field transducer and the near field transducer is positioned between the optical waveguide and the heat sink, and wherein at least a portion of at least one of the heat sink, the optical waveguide, or the write pole includes beryllium oxide (BeO).

20 Claims, 9 Drawing Sheets

(56) References Cited

U.S. PATENT DOCUMENTS

| | | | |
|---|---|---|---|
| 2012/0039155 A1 * | 2/2012 | Peng et al. | 369/13.14 |
| 2012/0045662 A1 | 2/2012 | Zou | |
| 2012/0051196 A1 | 3/2012 | Grobis | |
| 2012/0163139 A1 | 6/2012 | Vavra | |

* cited by examiner

HEAT ASSISTED MAGNETIC RECORDING DEVICES

PRIORITY

This application is a continuation-in-part of U.S. patent application Ser. No. 12/976,559 entitled "HEAT-SINKS FOR OPTICAL NEAR-FIELD TRANSDUCERS", filed on Dec. 22, 2010 and ultimately published as United States Patent Publication Number 2012/0163139; and is a non-provisional application of U.S. Provisional Application Ser. No. 61/638,254 filed on Apr. 25, 2012, entitled "USING BEO FOR HAMR WAVEGUIDE", the disclosures of which are incorporated herein by reference thereto.

BACKGROUND

In heat assisted magnetic recording (HAMR), information bits are recorded on data storage medium. The data bit dimension can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. Data is then written to the reduced coercivity region.

Current HAMR recording head designs generally have a near field transducer (NFT) that is capable of focusing light to a spot size smaller than the diffraction limit. The NFT is designed to reach local surface-plasmon at a designed light wavelength. At resonance, a high electric field surrounding the NFT arises, due to the collective oscillation of electrons in the metal. A portion of the field will tunnel into the storage medium and get absorbed, raising the temperature of the medium locally for recording.

The NFT's temperature significantly increases at plasmonic resonance. There remains a need for devices that are better equipped to deal with the high temperatures present with a NFT while not detrimentally affecting the NFT or other components of the device.

SUMMARY

Disclosed herein are devices having an air bearing surface, the device including a magnetic write pole positioned adjacent the air bearing surface; a near field transducer including a peg region and an adjacent disk region, wherein the peg region is adjacent the air bearing surface; a heat sink; and an optical waveguide including a top cladding layer and a core layer, wherein the heat sink is positioned between the magnetic write pole and the near field transducer and the near field transducer is positioned between the optical waveguide and the heat sink, and wherein at least a portion of at least one of the heat sink, the optical waveguide, or the write pole includes beryllium oxide (BeO).

Also disclosed are devices having an air bearing surface, the devices including a magnetic write pole positioned adjacent the air bearing surface; a near field transducer (NFT) including a peg region and an adjacent disk region, wherein the peg region is adjacent the air bearing surface; a heat sink, the heat sink including a region adjacent the air bearing surface between the peg of the NFT and the write pole; an optical waveguide including a top cladding layer comprising a back portion and a core adjacent portion; and a core layer, wherein the heat sink is positioned between the magnetic write pole and the near field transducer and the near field transducer is positioned between the optical waveguide and the heat sink, and wherein at least a portion of the heat sink and the optical waveguide comprises beryllium oxide (BeO).

Also disclosed are data storage devices that include a transducer having a source of electromagnetic radiation; an optical waveguide that includes a top cladding layer having a back portion and a core adjacent portion; and a core layer; a near field transducer (NFT) including a peg region and an adjacent disk region, wherein the peg region is adjacent the air bearing surface; a magnetic write pole positioned adjacent the air bearing surface; and a heat sink, the heat sink having a region adjacent the air bearing surface between the peg of the NFT and the write pole; wherein at least a portion of the heat sink, the optical guide, or both include beryllium oxide (BeO); and magnetic storage media.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
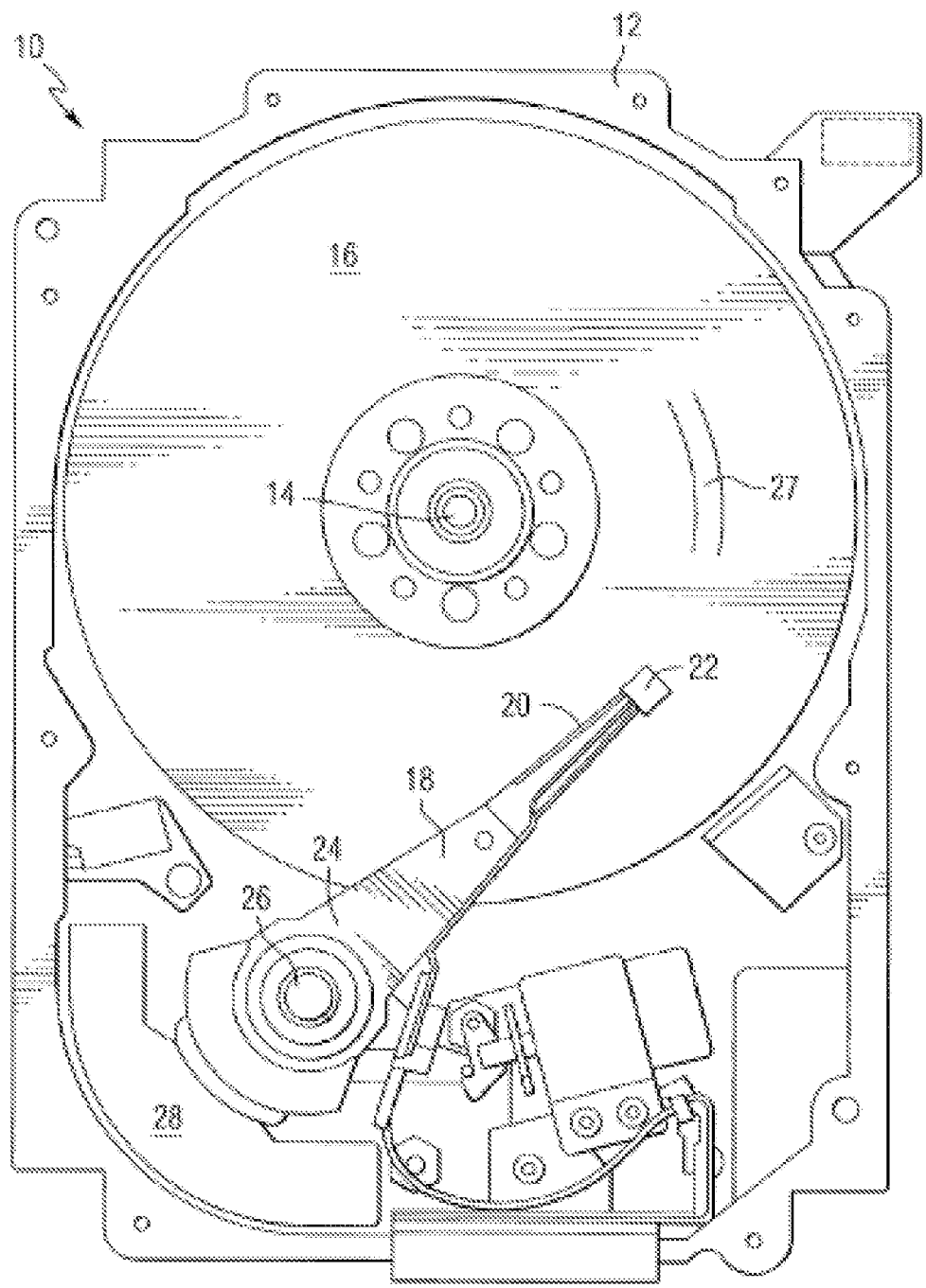
FIG. 1 is a pictorial representation of a data storage device in the form of a disc drive that can include a device or a recording head as disclosed herein.

FIG. 1 is a pictorial representation of a data storage device in the form of a disc drive 10 that can utilize recording heads constructed in accordance with various disclosed embodiments. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Some designs of HAMR recording heads can include a thin film waveguide on a slider to guide light to the storage media for localized heating of the storage media. While FIG. 1 shows a disc drive, disclosed embodiments can be applied to other devices that include a transducer and a storage media, wherein the storage media is heated to facilitate switching of bits in the storage media.

Figure 2:
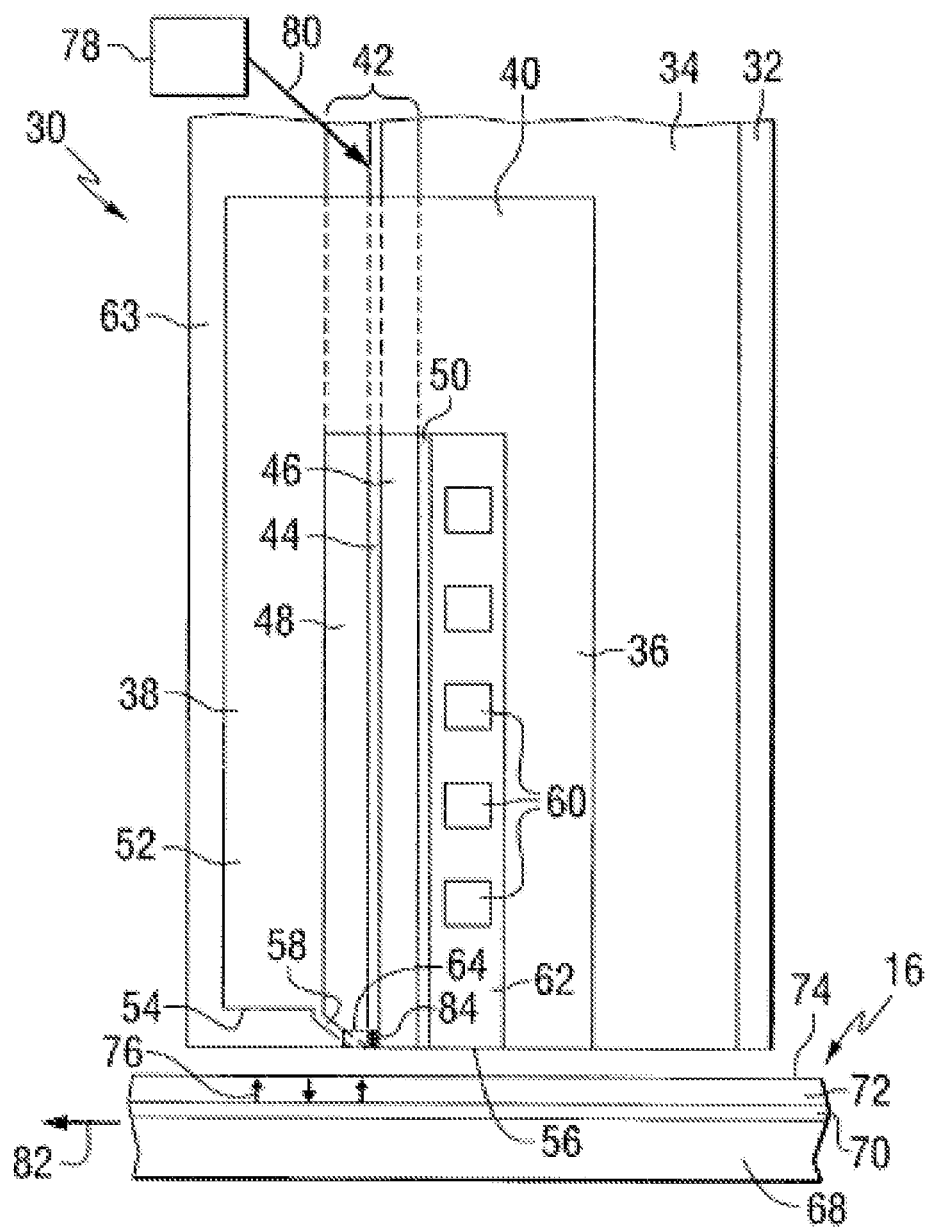
FIG. 2 is a side elevation view of an embodiment of a device, for example a recording head as disclosed herein.

FIG. 2 is a side elevation view of a recording head constructed in accordance with disclosed embodiments, and positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and bottom and top cladding layers 46 and 48 respectively on opposite sides of the core layer. A mirror 50 is positioned adjacent to the bottom cladding layer 46. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 can be positioned adjacent to the sloped pole piece 58. The heat sink can be comprised of a non-magnetic material such as, for example, Au as well as other materials as disclosed herein.

As illustrated in FIG. 2, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near field transducer (NFT) 84 is positioned in or adjacent to the waveguide and at or near the air bearing surface. The heat sink material may be chosen such that it does not interfere with the resonance of the NFT. In various embodiments, the near field transducer can take the form of an antenna, or a disc and peg.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Figure 3:
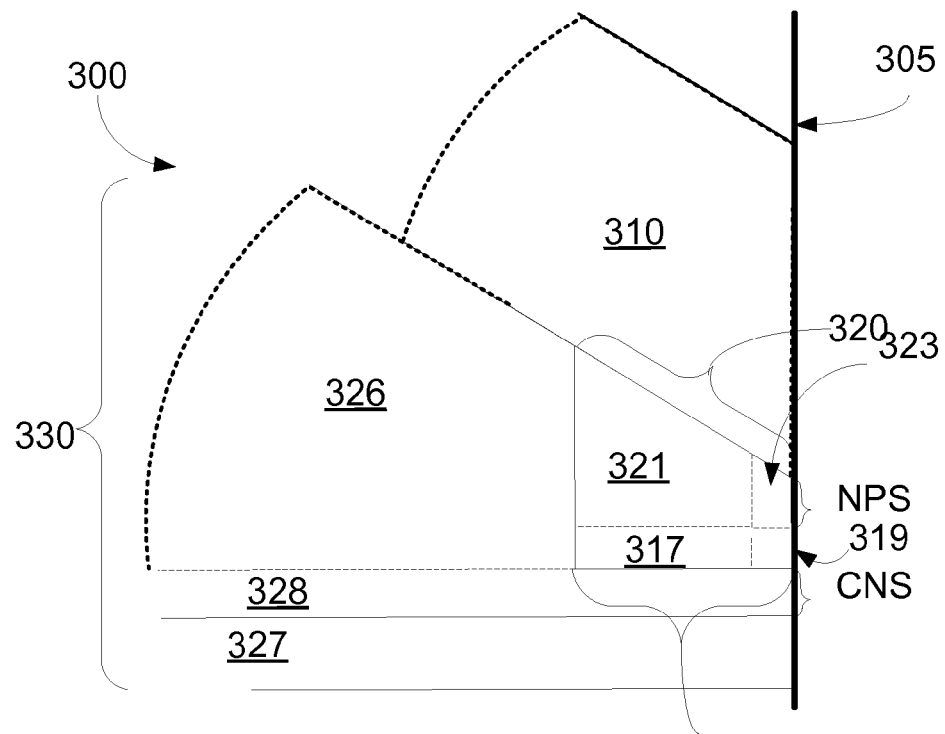
FIG. 3 illustrates a cross-sectional view of a portion of a disclosed device.

FIG. 3 illustrates a cross-sectional view of a portion of a disclosed device 300. The device 300 has an air bearing surface (ABS) 305. The device includes a magnetic write pole 310. The write pole 310 in FIG. 3 can be considered to be analogous to the sloped pole piece 58 of the top pole 38 seen in FIG. 2. The write pole 310 is positioned adjacent to and includes an end adjacent to the air bearing surface 305 of the device.

Also included is a near field transducer (NFT) 315. The NFT 315 receives electromagnetic radiation from the light source and focuses it onto the media. Exemplary NFTs can be described as having a two part structure, but it should be recognized that the described embodiments can be utilized with any type of structure of NFT (for example plasmonic gap type NFTs or peg and disc type NFTs, which can also be referred to as "lollipop" type NFTs). In some embodiments, for example peg and disk types, also known as lollipop designs can be utilized. The exemplary NFT 315 depicted in FIG. 3 includes a disk region 317 and a peg region 319. In the embodiment depicted in FIG. 3, the peg region 319 of the NFT is adjacent the air bearing surface 305. In some embodiments, the NFT can be a continuous structure, with the disk region and peg region being defined by the structures of the two region and not any difference in materials or breaks in structure. In some embodiments, the NFT can be one continuous mass of material. Generally, the NFT can be made of plasmonic material. For example, in some embodiments, the NFT (both the disk region 317 and the peg region 319) can be made of materials, such as gold (Au), gold (Au) doped with another material (for example, AuGe), silver (Ag), silver (Ag)

doped with another material (for example, AgGe), copper (Cu), and aluminum (Al). In some embodiments, the NFT 315 can also be made of materials listed in U.S. Patent Publication 2011/0205863 entitled "HAMR NFT Materials with Improved Thermal Stability," filed Feb. 23, 2011, the disclosure of which is incorporated herein by reference thereto.

The device 300 also includes a heat sink 320. In some discussions of NFTs and devices including NFTs, heat sinks are considered as part of the NFT. The heat sink 320 can be, but need not be considered as part of the NFT. In some embodiments, at least a portion of the heat sink can be made of the same material as the heat NFT. Exemplary materials that can make up at least a portion of the heat sink can include for example gold (Au), silver (Ag), copper (Cu), tungsten (W), and binary or ternary alloys thereof. Generally, the heat sink or the heat sink portion of the NFT functions to move heat away from the NFT, which when in use, will generate significant heat. Generally, the heat sink can be positioned adjacent the NFT, or as mentioned above, can be considered to be part of the NFT. The heat sink can also be positioned adjacent the write pole 310. The heat sink can also be described as being positioned between the write pole 310 and the NFT 315. The heat sink 320 can be further described as having two portions, the back portion 321, which is removed from the air bearing surface 305 and the front portion 323, which is adjacent to or at the air bearing surface 305. The front portion 323 of the heat sink can be more fully described by being between the peg portion 319 (although not seen from the perspective of FIG. 3, the peg portion 319 would be defined, in the case of a lollipop type of NFT, as the end of the peg/beginning of the disk) of the NFT 315 and the write pole 310. The front portion 323 of the heat sink 320 defines the NFT to pole spacing, which can be referred to as "NPS".

The device 300 also includes an optical waveguide 330. The waveguide can function to conduct electromagnetic radiation from a light source (not depicted in FIG. 3 but can be seen in FIG. 2) toward the NFT. Generally, a waveguide includes a core layer or layers surrounded by one or more cladding layers. The cladding layers have indices of refraction that are lower than that of the cladding layers so that light entering the entrance of the waveguide is propagated along the waveguide through the core layer. The exemplary waveguide 330 seen in FIG. 3 includes a core layer 327 a back portion 326, which is located behind (with respect to the ABS being in "front") the NFT 315 and heat sink 320; and a core adjacent portion 328, which is located adjacent the core layer 327. In some embodiments, the core layer 327 can have an index of refraction ≥1.9; and the core adjacent portion 328 can have an index of refraction ≤1.9. Such embodiments can provide for the manufacture of a disc size that is desirable given the resonance of the NFT. The core adjacent portion 328 can be considered a cladding layer if the core layer 327 has a higher index of refraction that it. In other embodiments, the core adjacent layer 328 can work with the core layer 327 as part of the core layer of the waveguide. In all discussed embodiments the back portion 326 can have a lower index of refraction that the core layer 327 and the core adjacent layer 328.

The portion of the core adjacent portion 328 located between the peg portion 319 of the NFT 315 and the core layer 327 defines the core to NFT spacing, which can be referred to as "CNS". Generally, the NFT is positioned between the core adjacent portion 328 of the top cladding layer 330 and the write pole 310. The NFT can also be described, in some embodiments, as being formed in the top cladding of the optical waveguide. Generally, the top cladding layer (when not formed of BeO as described below) can be made of, for example, $Al_2O_3$, $SiO_2$, $Si_3N_4$, and their binary or ternary compounds with elements such as Ta, Ti, Nb, Zr, Hf, and Y for example.

In disclosed devices, at least a portion of one or more of the heat sink, the optical waveguide, or the write pole includes beryllium oxide (BeO). BeO is a material that is relatively highly thermally conductive and has relatively good optical properties. As such, BeO can serve a dual purpose, in some embodiments of conducting heat away from the NFT and optically guiding light in the waveguide. In some embodiments, BeO has a thermal conductivity value of 250 W/mK, and may optionally be expected to be a hydrothermal corrosion resistant material. BeO films can be transparent in the near infrared (NIR) range, can have a refractive index of about 1.7, and are generally resistant to UV damage.

In some embodiments, portions of the device that are discussed herein as being made of BeO can optionally be made of other materials. One such material is AlN. In some embodiments, the use of AlN (instead of BeO) could be less advantageous because AlN has a relatively high index of refraction (n>2.0). Another such material is MgO. MgO has more favorable optical properties than AlN (n=1.7) but its thermal conductivity in thin film format is much lower (around 15-20 W/m/K).

Generally, thin films of BeO can be deposited using known methods, including for example radio frequency (RF) sputtering from a BeO target or reactive sputtering from a beryllium (Be) target. Alternatively, BeO films can be formed using atomic layer deposition (ALD) with precursors including, for example, dimethylberyllium ($Be(CH_3)_2$).

The illustrations of FIGS. 4A, 4B, 4C, 5A, 5B, 5C, 5D 6A, 6B, 6C, 6D, 6E and 7 include exemplary embodiments having at least a portion of at least one of the heat sink, the optical waveguide, or the write pole made of BeO. It should be noted that in the illustrations of FIGS. 4A, 4B, 4C, 5A, 5B, 5C, 5D, 6A, 6B, 6C, 6D, 6E and 7, the portion or portions which can be made of BeO in the disclosed embodiment are noted by stippling and different reference numerals, and the remaining components are numbered as seen in FIG. 3 for the sake of clarity.

Figure 4A:
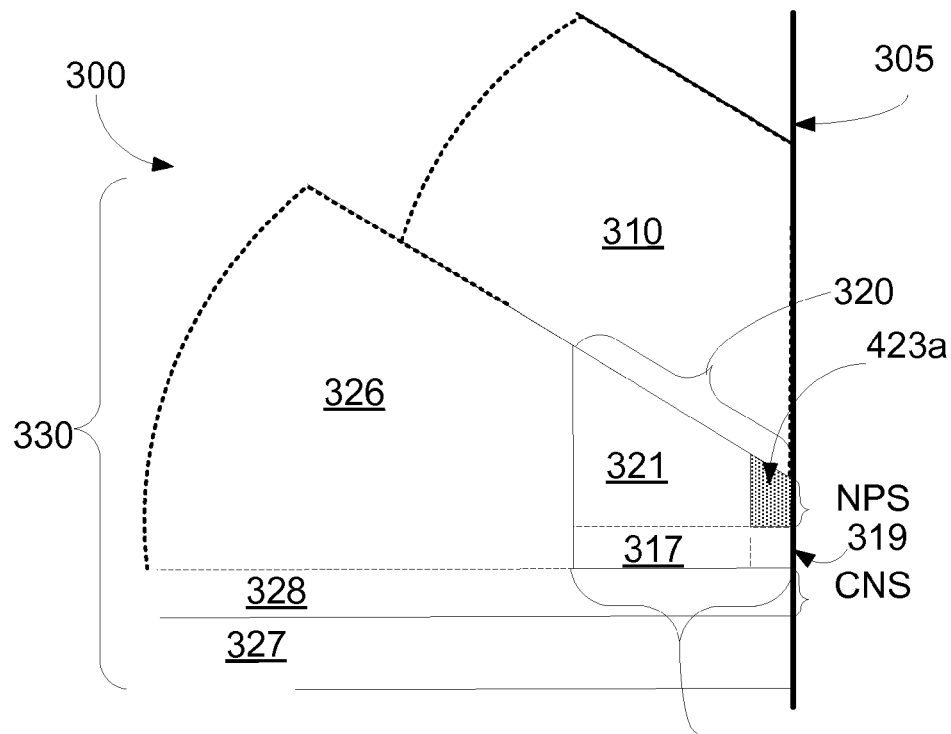
FIGS. 4A, 4B, and 4C illustrate cross-sectional views of disclosed devices having portions of the heat sink replaced with highly thermally conductive material.
Figure 4B:
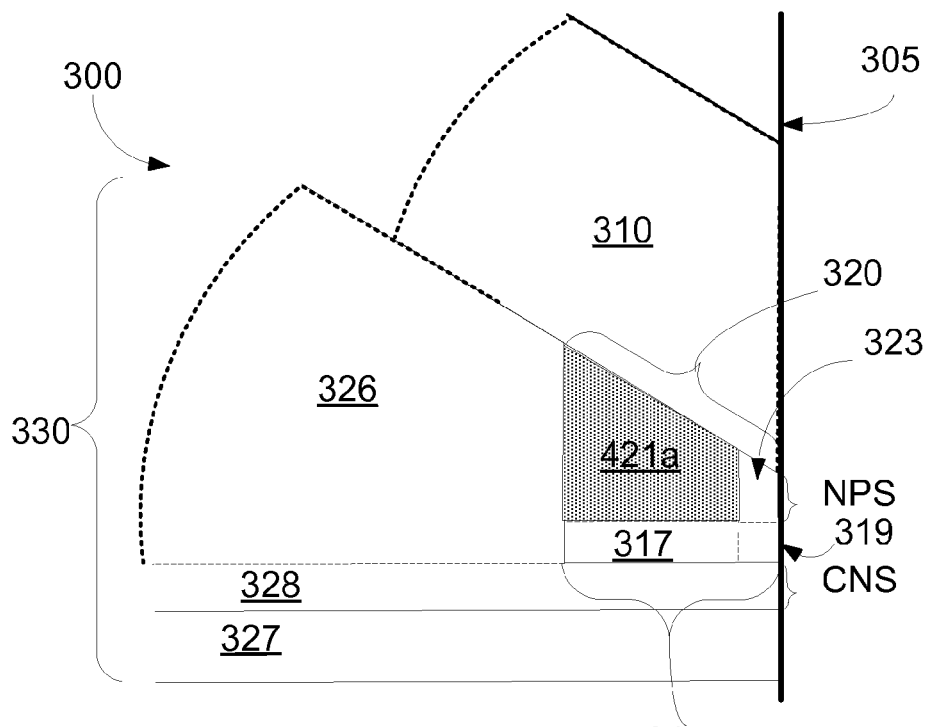
Figure 4C:
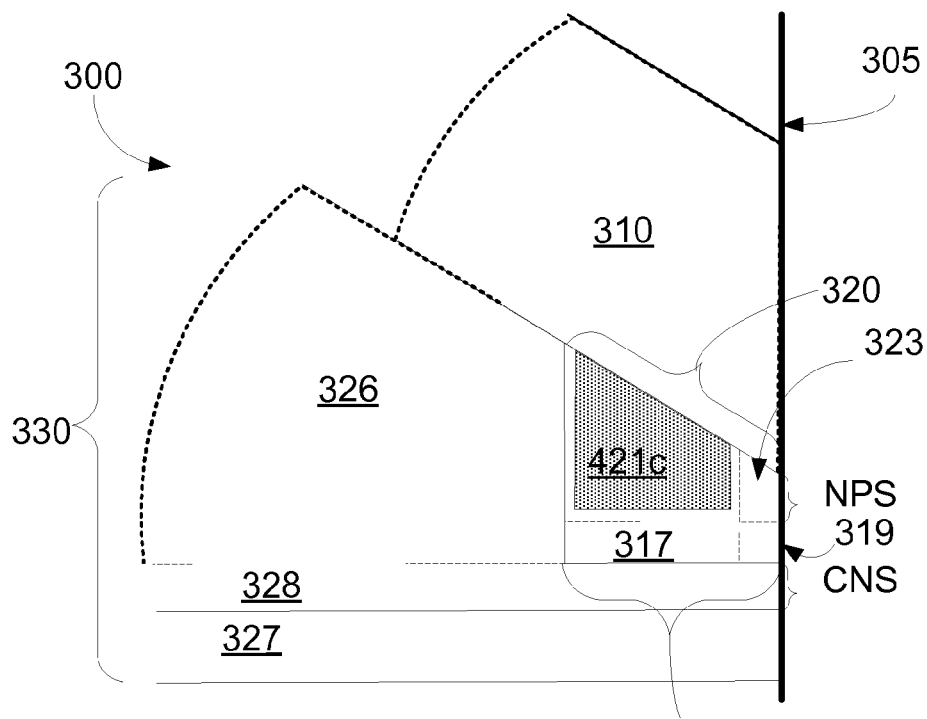

In some embodiments, at least a portion of the heat sink of disclosed devices can include or be made from BeO for example. In some embodiments at least a portion of only the heat sink can include or be made from BeO for example. FIGS. 4A, 4B, and 4C include exemplary embodiments showing portions of heat sinks that can include BeO. In the embodiment depicted in FIG. 4A, the front portion 423a of the heat sink can be made of BeO for example. This embodiment can also be described as filling the NFT to pole spacing "NPS" with BeO. Such an embodiment provides BeO, which is highly thermally conductive, between the peg region 319 and the write pole 310. Such an embodiment can be advantageous because the peg region 319 is generally the hottest region of the NFT during operation. Another exemplary embodiment in which at least a portion of the heat sink, or for example only the heat sink is made of BeO for example is depicted in FIG. 4B. In this embodiment, the back portion 421a of the heat sink 420 can be made of BeO for example. This can also be described as filling everything but the NPS with BeO. In such an embodiment, the BeO can serve as a heat sink as well as a diffusion barrier between the NFT and the write pole. Another exemplary embodiment in which at least a portion of the heat sink, or for example only the heat sink is made of BeO for example is depicted in FIG. 4C. In this embodiment, a portion of the back portion 421c of the heat sink 420 can be made of BeO for example. This embodiment is similar to that depicted in FIG. 4B, except that a shell of plasmonic material (for example, Au, Ag, etc.) remains on the edges of the BeO that are not in contact with the write pole 310. In such an embodiment, the BeO can serve as a heat sink inside the Au (or other material as indicated previously) shell as well as limit the volume of Au in the NFT. This could be desirable because Au can be more thermally unstable and have higher mobility than BeO.

Figure 5A:
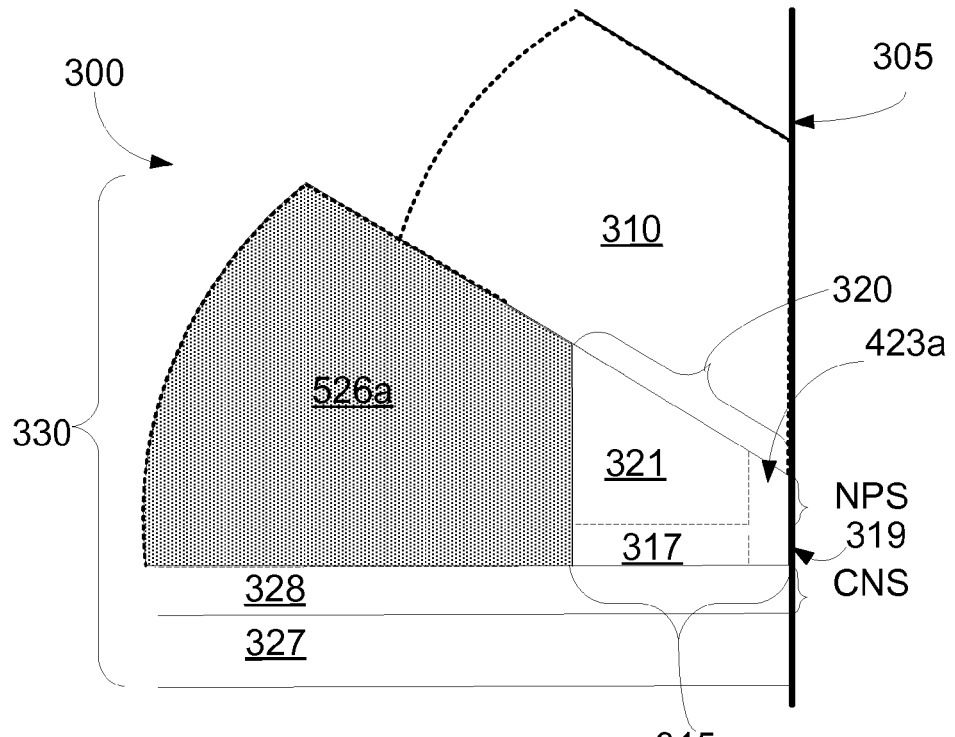
FIGS. 5A, 5B, 5C, and 5D illustrate cross-sectional views of disclosed devices having portions of the optical waveguides replaced with highly thermally conductive material.
Figure 5B:
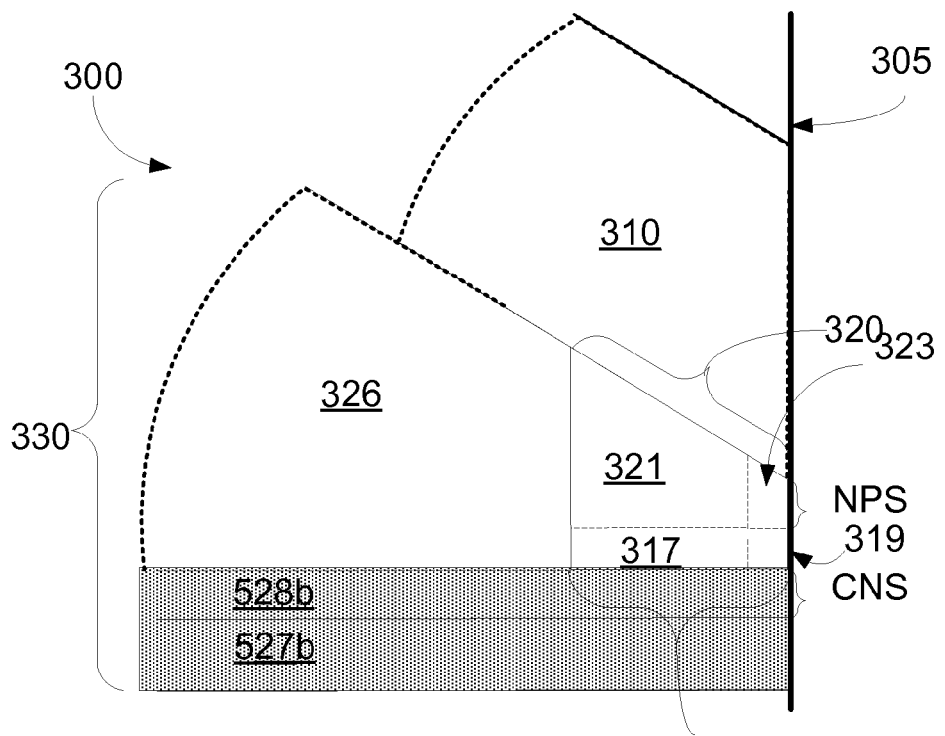
Figure 5C:
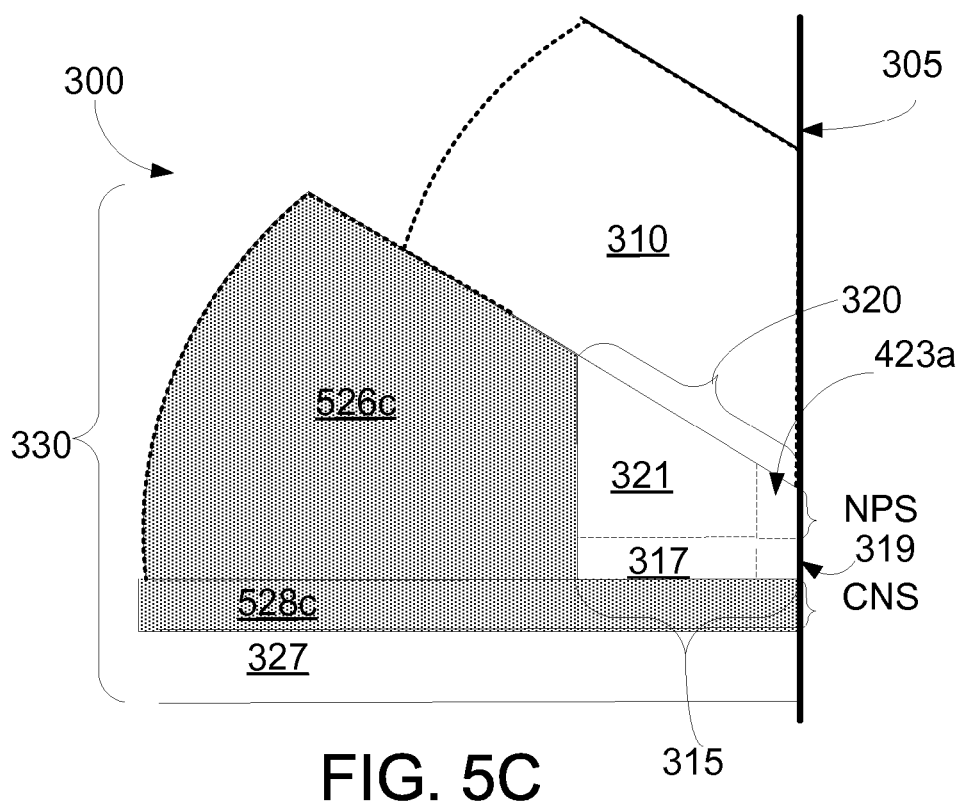
Figure 5D:
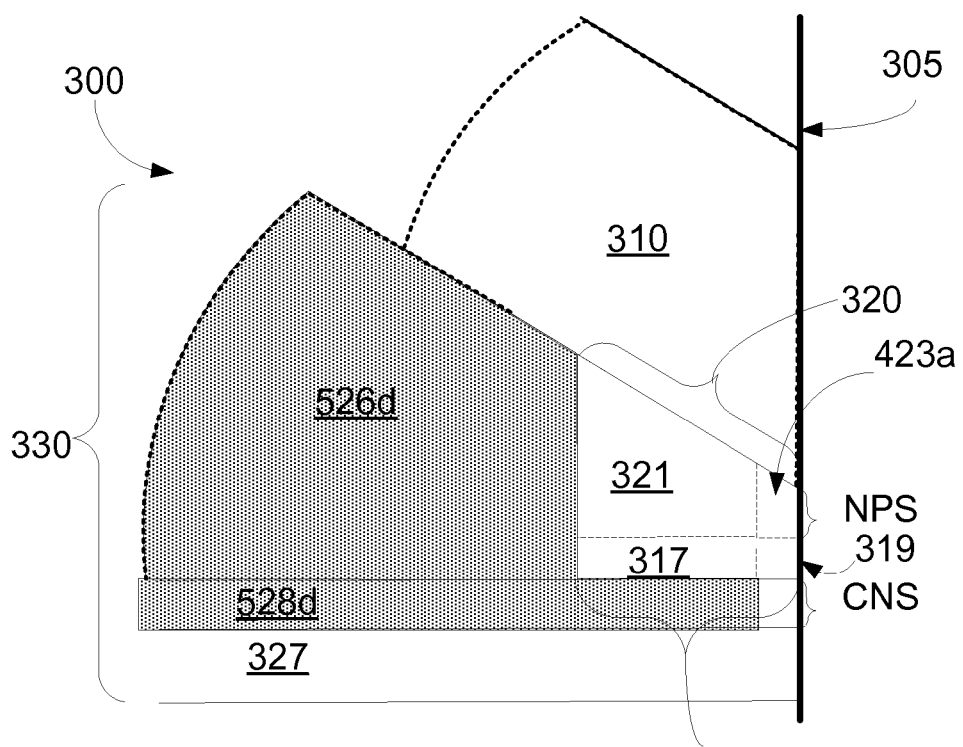

In some embodiments, at least a portion of the optical waveguide of disclosed devices can include or be made from BeO for example. In some embodiments at least a portion of only the optical waveguide can include or be made from BeO for example. FIGS. 5A, 5B, and 5C include exemplary embodiments showing portions of optical waveguides that can include BeO. In the embodiment depicted in FIG. 5A the back portion 526*a* of the top cladding layer 330 can be made of BeO. In such an embodiment, the BeO can extend the heat sink effect from the NFT to the waveguide cladding portion behind the NFT. Such a configuration is practically possible, with respect to the optical requirements of the device, because of the optical properties of BeO. In the embodiment depicted in FIG. 5B, both the core layer 527*b* and the core adjacent cladding layer 528*b* can be made of BeO. Although not shown in FIG. 5B, the BeO can be present all the way down to the bottom pole (designated as bottom pole 36 in FIG. 2). In such an embodiment, the BeO can direct heat from the bottom of the NFT. Such a configuration is practically possible, with respect to the optical requirements of the device, because of the optical properties of BeO. In the embodiment depicted in FIG. 5C, both the core adjacent cladding layer 528*c* and the back portion 526*c* of the top cladding layer can be made of BeO. In such an embodiment, the BeO can direct heat away from the bottom and backside of the NFT. Such a configuration is practically possible, with respect to the optical requirements of the device, because of the optical properties of BeO. In the embodiment depicted in FIG. 5D, both the back portion 526*d* of the top cladding layer and a portion of the core adjacent cladding layer 528*d* can be made of BeO. As seen in FIG. 5D, the portion of the core adjacent cladding layer 528*d* behind (with respect to the ABS being the front) the peg region 319 is present whereas the portion of the core adjacent cladding layer 528*d* adjacent to the peg region 319 is not BeO.

In some embodiments, at least portions of both the heat sink and the optical waveguide of disclosed devices can include or be made from BeO for example. FIGS. 6A, 6B, 6C and 6D include exemplary embodiments showing portions of both heat sinks and optical waveguides that can include or be made of BeO. In the embodiment depicted in FIG. 6A both the front portion 623*a* of the heat sink 320 and a front portion 629*a* of the core adjacent cladding layer 328 can include or be made of BeO. The front portion 629*a* can generally be described as the portion of the core adjacent cladding layer 328 that is as far back from the ABS as the peg portion 319 of the NFT is back from the ABS. Such an embodiment provides BeO, which is highly thermally conductive, completely surrounding the peg region 319. Such an embodiment can be advantageous because the peg region 319 is generally the hottest region of the NFT during operation. In the embodiment depicted in FIG. 6B both the front portion 623*a* of the heat sink 320, the core adjacent cladding layer 628*b*, and the core layer 627*b* can include or be made of BeO. In such an embodiment, the BeO can direct heat from the hottest part of the NFT, the peg, to both the write pole and the core. Such a configuration is practically possible, with respect to the optical requirements of the device, because of the optical properties of BeO. In the embodiment depicted in FIG. 6C the front portion 623*c* of the heat sink 320, the back portion 626*c* of the top cladding layer and the core adjacent layer 628*c* of the top cladding layer include or are made of BeO. By sinking an NFT having Au (or other metal) heat sink into the BeO, the effect of the BeO heat sink can be maximized. Because of the good optical properties of BeO, there should be no concomitant optical penalty. In the embodiment depicted in FIG. 6D the front portion 623*d* of the heat sink 320, the back portion 621*d* of the heat sink 320, the back portion 626*d* of the top cladding layer and the core adjacent layer 628*d* of the top cladding layer include or are made of BeO. This embodiment can also be characterized as including the entire heat sink and all of the top cladding layers. By sinking an NFT having Au (or other metal) heat sink into the BeO, the effect of the BeO heat sink can be maximized. Such a configuration can also minimize the risk of Au (or other metal) diffusing into the write pole. Because of the good optical properties of BeO, there should be no concomitant optical penalty. In the embodiment depicted in FIG. 6E the front portion 623*e* of the heat sink 320 and the back portion 626*e* of the top cladding layer are made of BeO. In such an embodiment, the BeO can direct the heat from the hottest part of the NFT, the peg, and the backside of the NFT to both the write pole and the waveguide top cladding. Such a configuration is practically possible, with respect to the optical requirements of the device, because of the optical properties of BeO.

In some embodiments, at least a portion of the write pole of disclosed devices can be made from or include BeO for example. In the embodiment depicted in FIG. 7, a portion 740 of the write pole, for example a portion adjacent the ABS, and the front portion 723 of the heat sink 320 can be made from or include BeO. In some embodiments, the portion 740 of the write pole can be congruous with the front portion 723 of the heat sink 320, which is defined by the depth of the peg from the ABS, for example. Such an embodiment can extend the heating conduit from the front portion 723 of the heat sink all the way out the write pole 310 further away from the NFT which may afford better heat transfer from the NFT. This configuration may also effectively recess the pole from the ABS which may minimize the risk of pole corrosion at elevated temperatures near the ABS.

It should also be noted that various combinations of the embodiments or portions of the embodiments disclosed herein are also considered part of this disclosure.

Systems including various other elements or devices may also be included in this disclosure. For example, systems that can include sources of electromagnetic radiation, for example as illustrated above with respect to FIG. 2, are also disclosed herein. Disc drives including such devices and systems are also disclosed herein. While FIG. 1 shows a disc drive, disclosed embodiments can also be applied to other devices that include a transducer and storage media, wherein the storage media is heated to facilitate switching of bits in the storage media.

The present disclosure is illustrated by the following examples. It is to be understood that the particular examples, and procedures are to be interpreted broadly in accordance with the scope and spirit of the disclosure as set forth herein.

EXAMPLES

Modeling was done to compare some of the disclosed embodiments. Specifically, the temperature rise at the peg of the NFT when the device is exposed to a thermal load of 1 mW of incident power was determined. Table 1 indicates assumed values for the thermal conductivity of the material in the stippled region of the noted figure. It should be noted that the comparison provided by version 2 when k=1.35 W/mK, represents the situation in which the stippled regions are made of $Al_2O_3$. The values of the thermal conductivity, k, are assumed to be 50 W/mK and 100 W/mK (versus the reported 250 W/mK thermal conductivity of BeO) in order to provide conservative estimates of the effect of the BeO on the system. The results shown in Table 1 are given as temperature rise (K/m/W). The percent drop (% drop) in the last row are compared versus the highest temperature increase (18.26 seen for the FIG. 6A embodiment when the stippled region is made of $Al_2O_3$).

TABLE 1

Figure 6A:
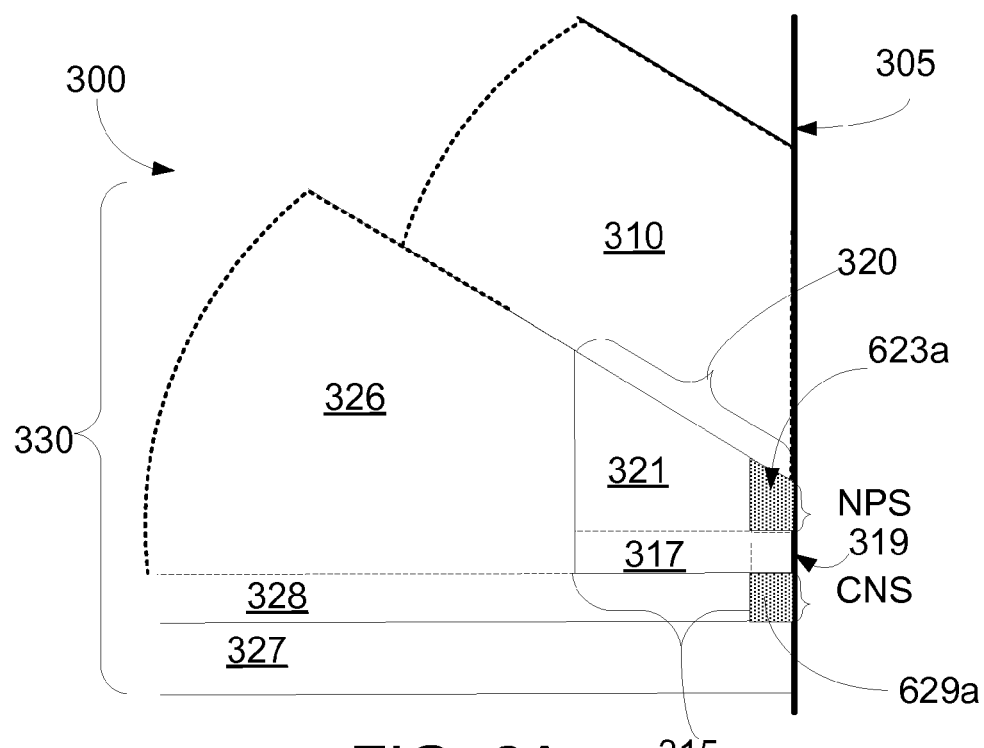
FIGS. 6A, 6B, 6C, 6D, and 6E illustrate cross-sectional views of disclosed devices having portions of both the heat sink and the optical waveguides replaced with highly thermally conductive material.
Figure 6B:
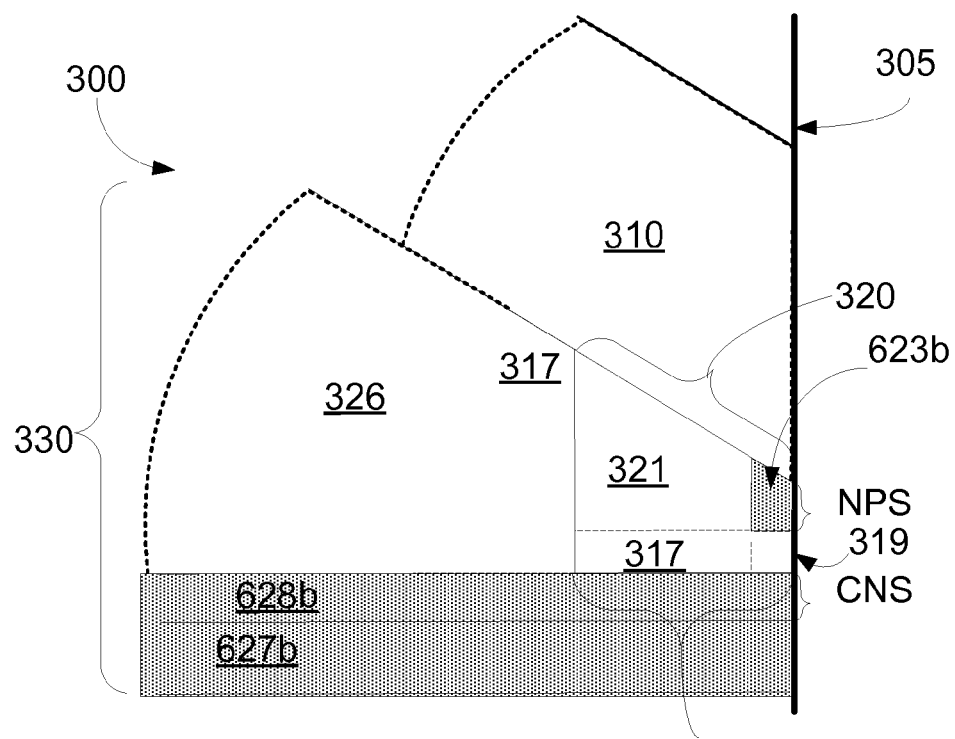
Figure 6C:
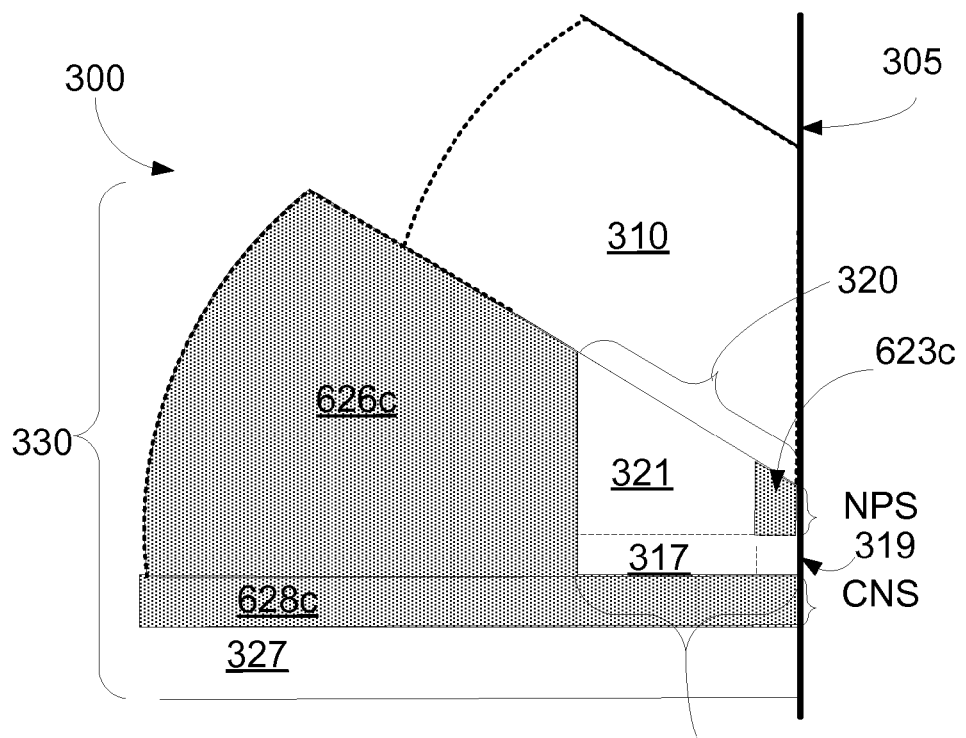
Figure 6D:
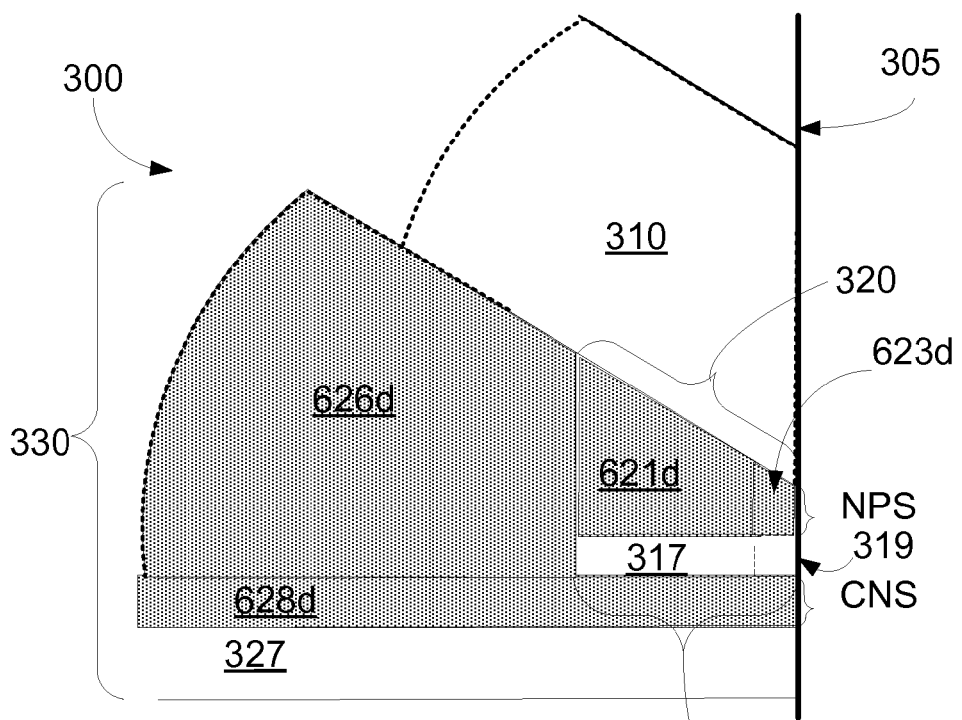
Figure 6E:
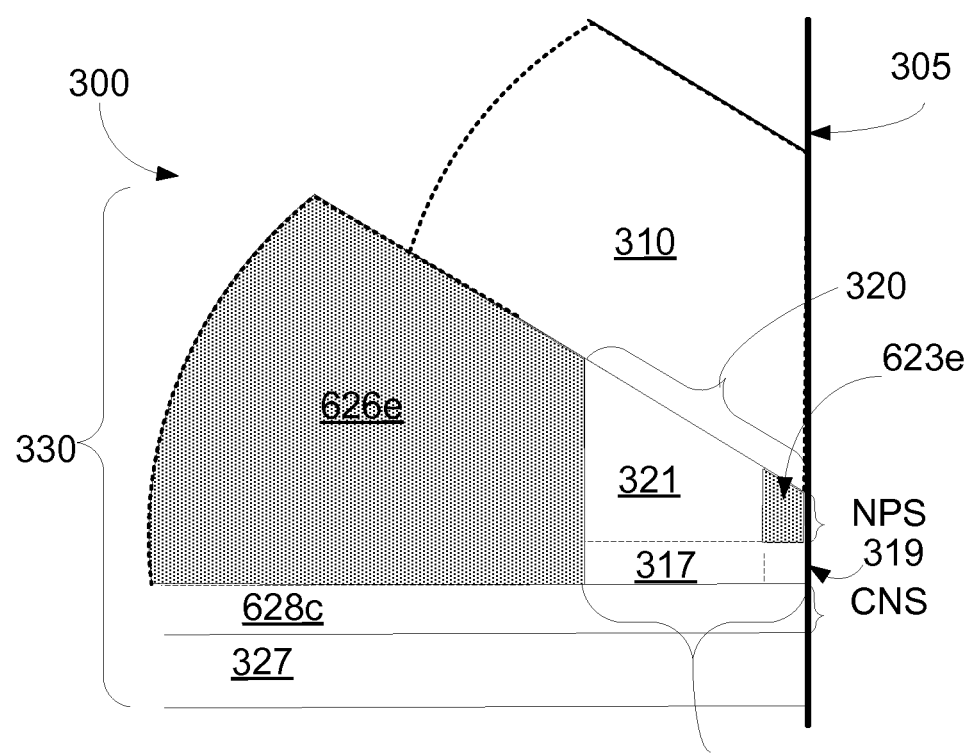
Figure 7:
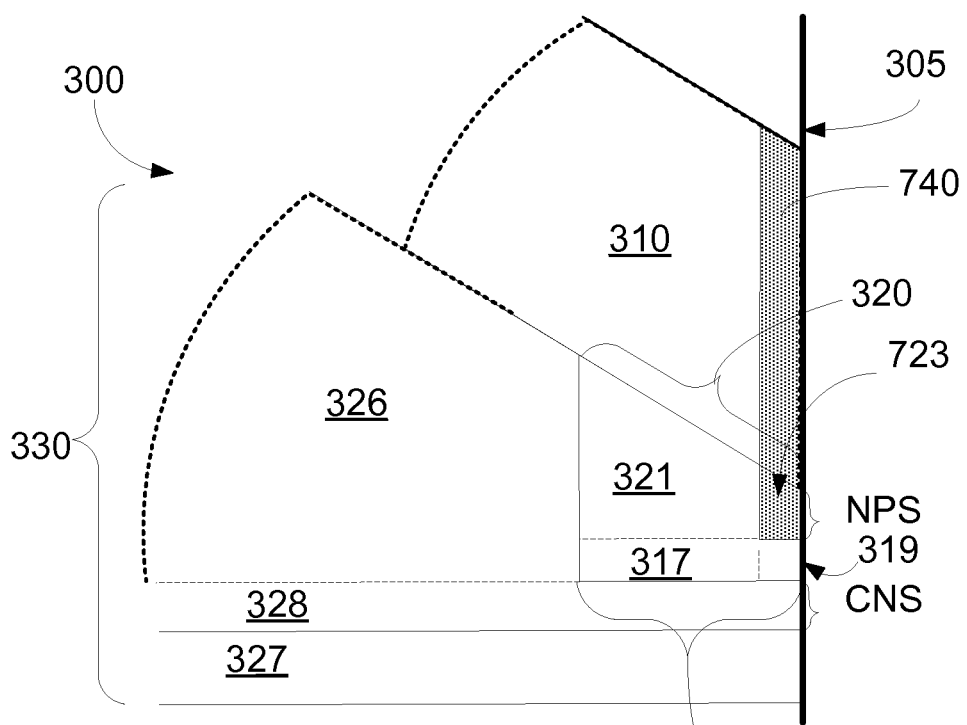
FIG. 7 illustrates a cross-sectional view of a disclosed device having a portion of the write pole replaced with highly thermally conductive material.

| | | | Temperature Rise [K/mW (IP)] | | | |
|---|---|---|---|---|---|---|
| k (W/mK) | FIG. 4 | FIG. 6A | FIG. 6E | FIG. 6C | FIG. 6D | FIG. 5D |
| 1.35 | | 18.26 | | | | |
| 50 | 16.57 | 14.98 | 14.82 | 13.5 | 14.34 | 16.86 |
| 100 | | 13.88 | 13.51 | 11.88 | 11.96 | 16.08 |
| % drop | 9.2 | —, 18, 24 | 18.8, 26 | 26, 35 | 21.4, 34.5 | 7.6, 11.9 |

A comparison of the results seen in Table 1 shows the benefit of having the high thermally conductive material around the peg region at the ABS. For example, comparing the results for the configurations of FIG. 6C versus FIG. 5D, where the configurations are identical except that BeO is not present in the volume around the peg in FIG. 5D, the temperature reduction is much lower, from 35% to 11.9% respectively. The results also show that about a 10% maximum temperature reduction is gained by placing BeO material at each location: at the NPS, at the CNS, and surrounding the rest of the NFT. For example, comparing the results for FIG. 6D with FIG. 5D, a benefit of 11.9% is seen by surrounding the NFT everywhere except at the NPS and the CNS (around the peg region). Comparing the results of FIG. 6E with FIG. 6C highlights the benefit of placing the BeO at the CNS, specifically; the BeO reduces the temperature rise by 9%. The results for FIG. 4 show that placing BeO at the NPS region only reduced the temperature rise by 9%. Also, comparing the results of FIG. 4 with FIG. 6A shows that placing BeO at the NPS and the CNS further reduces the temperature rise by another 9%, for a total reduction of 18%.

Thus, embodiments of heat assisted magnetic recording (HAMR) devices are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface, the device comprising:
    a magnetic write pole positioned adjacent the air bearing surface;
    a near field transducer comprising a peg region and an adjacent disk region, wherein the peg region is adjacent the air bearing surface;
    a heat sink; and
    an optical waveguide comprising a top cladding layer and a core layer,
    wherein the heat sink is positioned between the magnetic write pole and the near field transducer and the near field transducer is positioned between the optical waveguide and the heat sink, and
    wherein at least a portion of at least the write pole comprises beryllium oxide (BeO).

2. The device according to claim 1, wherein at least a portion of the heat sink also comprises BeO.

3. The device according to claim 2, wherein a portion of the heat sink adjacent the air bearing surface also comprises BeO.

4. The device according to claim 2, wherein the heat sink comprises a BeO core and a shell of plasmonic material.

5. The device according to claim 1, wherein at least a portion of the optical waveguide also comprises BeO.

6. The device according to claim 5, wherein at least a portion of only the top cladding layer comprises BeO.

7. The device according to claim 6, wherein the complete top cladding layer comprises BeO.

8. The device according to claim 5, wherein at least a portion of both the top cladding and the core layer comprises BeO.

9. The device according to claim 1, wherein at least a portion of both the heat sink and the optical waveguide also comprises BeO.

10. The device according to claim 9, wherein at least a portion of the heat sink adjacent the air bearing surface comprises BeO.

11. The device according to claim 10, wherein at least a portion of the top cladding layer adjacent the air bearing surface also comprises BeO.

12. The device according to claim 11, wherein the entire top cladding layer comprises BeO.

13. The device according to claim 12, wherein the entire heat sink comprises BeO.

14. A system having an air bearing surface, the system comprising:
    a source of electromagnetic radiation;
    a magnetic write pole positioned adjacent the air bearing surface;
    a near field transducer (NFT) comprising a peg region and an adjacent disk region, wherein the peg region is adjacent the air bearing surface;
    a heat sink, the heat sink comprising a region adjacent the air bearing surface between the peg of the NFT and the write pole; and
    an optical waveguide comprising:
        a top cladding layer comprising a back portion and a core adjacent portion; and
        a core layer,
    wherein the heat sink is positioned between the magnetic write pole and the near field transducer and the near field transducer is positioned between the optical waveguide and the heat sink, and
    wherein at least a portion of at least the write pole comprises beryllium oxide (BeO).

15. The system according to claim 14, wherein the region of the heat sink adjacent the air bearing surface between the peg of the NFT and the write pole also comprises BeO.

16. The system according to claim 15, wherein both the back portion and the core adjacent portion of the top cladding layer comprise BeO.

17. The system according to claim 16, wherein the portion of the heat sink not adjacent to the air bearing surface comprises BeO.

18. A data storage device comprising:
   a transducer comprising:
      a source of electromagnetic radiation;
      an optical waveguide comprising:
         a top cladding layer comprising a back portion and a core adjacent portion; and
         a core layer;
      a near field transducer (NFT) comprising a peg region and an adjacent disk region, wherein the peg region is adjacent the air bearing surface;
      a magnetic write pole positioned adjacent the air bearing surface; and
      a heat sink, the heat sink comprising a region adjacent the air bearing surface between the peg of the NFT and the write pole;
      wherein at least a portion of at least the write pole comprises beryllium oxide (BeO); and
   magnetic storage media.

19. The data storage device according to claim 18, wherein the region of the heat sink adjacent the air bearing surface between the peg of the NFT and the write pole also comprises BeO.

20. The data storage device according to claim 19, wherein both the back portion and the core adjacent portion of the top cladding layer comprise BeO.

* * * * *